United States Patent
Horikoshi et al.

(10) Patent No.: US 11,428,198 B2
(45) Date of Patent: Aug. 30, 2022

(54) ENGINE STARTING DEVICE

(71) Applicants: STARTING INDUSTRIAL CO., LTD., Tokyo (JP); HONDA MOTOR CO., LTD., Tokyo (JP)

(72) Inventors: Yoshinori Horikoshi, Tokyo (JP); Tomoyasu Mizuno, Tokyo (JP); Akihito Kasai, Wako (JP); Hiroaki Hasebe, Wako (JP)

(73) Assignees: STARTING INDUSTRIAL CO., LTD., Tokyo (JP); HONDA MOTOR CO., LTD., Tokyo (JP)

( * ) Notice: Subject to any disclaimer, the term of this patent is extended or adjusted under 35 U.S.C. 154(b) by 61 days.

(21) Appl. No.: 17/026,511

(22) Filed: Sep. 21, 2020

(65) Prior Publication Data
US 2021/0404432 A1  Dec. 30, 2021

(30) Foreign Application Priority Data

Jun. 29, 2020 (JP) .............................. JP2020-111266

(51) Int. Cl.
  *F02N 3/02* (2006.01)
  *F02N 5/02* (2006.01)
(52) U.S. Cl.
  CPC ...... *F02N 3/02* (2013.01); *F02N 5/02* (2013.01)
(58) Field of Classification Search
  CPC ................. F02N 3/00; F02N 3/02; F02N 5/02
  See application file for complete search history.

(56) References Cited

U.S. PATENT DOCUMENTS

| | | | | | |
|---|---|---|---|---|---|
| 3,375,813 | A | * | 4/1968 | Hamman | F02N 3/02 123/185.2 |
| 3,827,307 | A | * | 8/1974 | Couchman, Jr. | F02N 3/02 74/6 |
| 4,732,121 | A | * | 3/1988 | Miyata | F02N 3/02 123/185.3 |
| 5,067,451 | A | * | 11/1991 | Tyler | F02N 3/02 123/185.3 |

(Continued)

FOREIGN PATENT DOCUMENTS

JP  2013-151898 A  8/2013

*Primary Examiner* — Phutthiwat Wongwian
*Assistant Examiner* — Anthony L Bacon
(74) *Attorney, Agent, or Firm* — Oliff PLC

(57) ABSTRACT

A rope reel includes first circumferential wall portion that is erectly provided so as to surround outer circumference of recoil spring. A starter case includes second circumferential wall portion that is erectly provided so as to adjoin inner circumferential face or outer circumferential face of first circumferential wall portion. The first circumferential wall portion and the second circumferential wall portion are disposed so that end edges of the first circumferential wall portion and the second circumferential wall portion overlap each other when viewed in radial direction. A plate is disposed between starter case and recoil spring inside first circumferential wall portion. Thus, it is possible to provide structure which is realized in space-saving manner to make foreign substances difficult to intrude into starting device in order to prevent deformation or damage of recoil spring, and from which the foreign substances are easily discharged even if foreign substances have intruded.

16 Claims, 15 Drawing Sheets

(56) References Cited

U.S. PATENT DOCUMENTS

| | | | | |
|---|---|---|---|---|
| 5,826,555 A * | 10/1998 | Aronsson | ................. | F02N 3/02 |
| | | | | 123/185.3 |
| 5,862,787 A * | 1/1999 | Unuma | ..................... | F02N 3/02 |
| | | | | 123/185.3 |
| 6,199,529 B1 * | 3/2001 | Kuwabara | ............... | F02B 63/02 |
| | | | | 123/179.24 |
| 2003/0015162 A1 * | 1/2003 | Harada | ..................... | F02N 3/02 |
| | | | | 123/185.14 |
| 2005/0252477 A1 * | 11/2005 | Schriever | ............. | F02N 15/026 |
| | | | | 123/185.14 |
| 2008/0072864 A1 * | 3/2008 | Fujita | ....................... | F02N 3/02 |
| | | | | 123/185.3 |
| 2010/0126455 A1 * | 5/2010 | Ziegs | ....................... | F02N 3/02 |
| | | | | 123/185.3 |
| 2013/0186363 A1 * | 7/2013 | Nieda | ..................... | F02N 1/02 |
| | | | | 123/185.3 |

\* cited by examiner

ENGINE STARTING DEVICE

TECHNICAL FIELD

The present invention relates to a starting device in which a rope can be pulled to apply rotational force to an engine so as to start the engine.

BACKGROUND ART

There has been known an engine starting device of this type, in which a rope wound around a rope reel is pulled to rotate the rope reel, and the rotation of the rope reel is transmitted to a rotation member coupled to a crankshaft of an engine so that the crankshaft of the engine is rotated through the rotation member to start the engine. In such a starting device, when an operator releases his/her hand from the let-out rope, the rope reel is rotated reversely by spring force accumulated in a recoil spring so that the rope is rewound by the rope reel.

When such a starting device is used in a dusty or dirty work environment, there is a possibility that foreign substances enter the starting device to cause damage to a machine mounted with the starting device. When, for example, a rope pulling operation is performed in a state in which the foreign substances have intruded into a space where the recoil spring is housed, there is a possibility that an unintended load is applied to deform the recoil spring. When the recoil spring is deformed, it may cause a failure that the rope rewinding operation cannot be normally performed or the rope pulling operation cannot be performed.

In order to solve such a problem, for example, the following structure has been described in JP-A-2013-151898. That is, a dustproof cover covering an opening portion of a housing portion is disposed on an engine side of a rope reel, a concentric ring-like convex-concave portion is provided in an engine-side side face of the rope reel and a concentric ring-like convex-concave portion is also formed in the dustproof cover. The ring-like convex-concave portion of the dustproof cover is put into the ring-like convex-concave portion of the rope reel, thereby forming a nested structure. The rope reel and a recoil spring are housed inside the nested structure. According to such a configuration, intrusion of dust or dirt can be prevented by the ring-like convex-concave portions. Consequently, it is possible to prevent malfunction or failure from being caused by the dust or dirt adhering to the recoil spring.

SUMMARY OF INVENTION

Such a starting device is, for example, used in a portable machine such as a lawn mower. It is desirable that the portable machine is downsized as much as possible in order to improve maneuverability, and the starting device is also required to be built in the machine in a space-saving manner as much as possible.

However, in the aforementioned configuration described in JP-A-2013-151898, thickness of the starting device increases due to the dustproof cover (the ring-like convex-concave portion). Therefore, improvement in the space-saving respect is necessary.

Further, intrusion of the foreign substances can be securely prevented by the ring-like convex-concave portions. On the other hand, there is a demerit that once the foreign substances have intruded into the ring-like convex-concave portions, the foreign substances are difficult to be discharged to the outside.

Therefore, an object of the present invention is to provide a structure which is realized in a space-saving manner to make foreign substances difficult to intrude into a starting device in order to prevent deformation or damage of a recoil spring, and from which the foreign substances are easily discharged even if the foreign substances have intruded.

SUMMARY OF INVENTION

In order to achieve the aforementioned object, the present invention provides an engine starting device including: a starter case; a rope reel that is rotatably assembled to the starter case; a rope that is wound around a retention groove formed in the rope reel; and a recoil spring that is housed between the starter case and the rope reel to exert urging force in a direction to rewind the rope; wherein: the rope reel includes a first circumferential wall portion that is erectly provided so as to surround an outer circumference of the recoil spring; the starter case includes a second circumferential wall portion that is erectly provided so as to adjoin an inner circumference face or an outer circumferential face of the first circumferential wall portion; the first circumferential wall portion and the second circumferential wall portion are disposed so that end edges of the first circumferential wall portion and the second circumferential wall portion overlap each other when viewed in a radial direction; and a plate is disposed between the starter case and the recoil spring inside the first circumferential wall portion.

According to the present invention as described above, the first circumferential wall portion formed in the rope reel and the second circumferential wall portion formed in the starter case are disposed so that the end edges of the first circumferential wall portion and the second circumferential wall portion overlap each other when viewed in the radial direction. With this arrangement, a labyrinth seal is formed by the first circumferential wall portion and the second circumferential wall portion overlapping each other, so that foreign substances in the structure are difficult to intrude into the starting device. Further, such a labyrinth seal is constituted by only the rope reel and the starter case. Thus, it is unnecessary to use another member so that thickness of the starting device also does not increase. Consequently, the structure in which the foreign substances are difficult to intrude into the starting device in order to prevent the recoil spring from being deformed or damaged can be realized in a space-saving manner.

Since the seal structure constituted by only the rope reel and the starter case is simple, the foreign substances may intrude into the seal. However, according to the present invention, the plate is disposed so as to partition the starter case and the recoil spring from each other. Thus, the foreign substances cannot reach the recoil spring even if the foreign substances have intruded into the seal. Rather, since the seal structure is simple, the invading foreign substances in the structure flow on a front face of the plate to be easily discharged to the outside before reaching the recoil spring. Consequently, the recoil spring is configured so as not to be affected by the foreign substances.

DESCRIPTION OF EMBODIMENT

An embodiment of the present invention will be described with reference to the drawings. In each of the drawings, arrows X, Y, and Z indicate directions orthogonal to one another. The X direction is a front-rear direction (forward/backward movement direction) of a portable machine (e.g. a lawn mower) in a state in which an engine has been mounted in the machine. The Y direction is a width direction (left-right direction) of the machine. The Z direction is an up-down direction (gravity direction). In the following description, the left-right direction designates the left/right of the machine which has faced the side to move forward.

Figure 1:
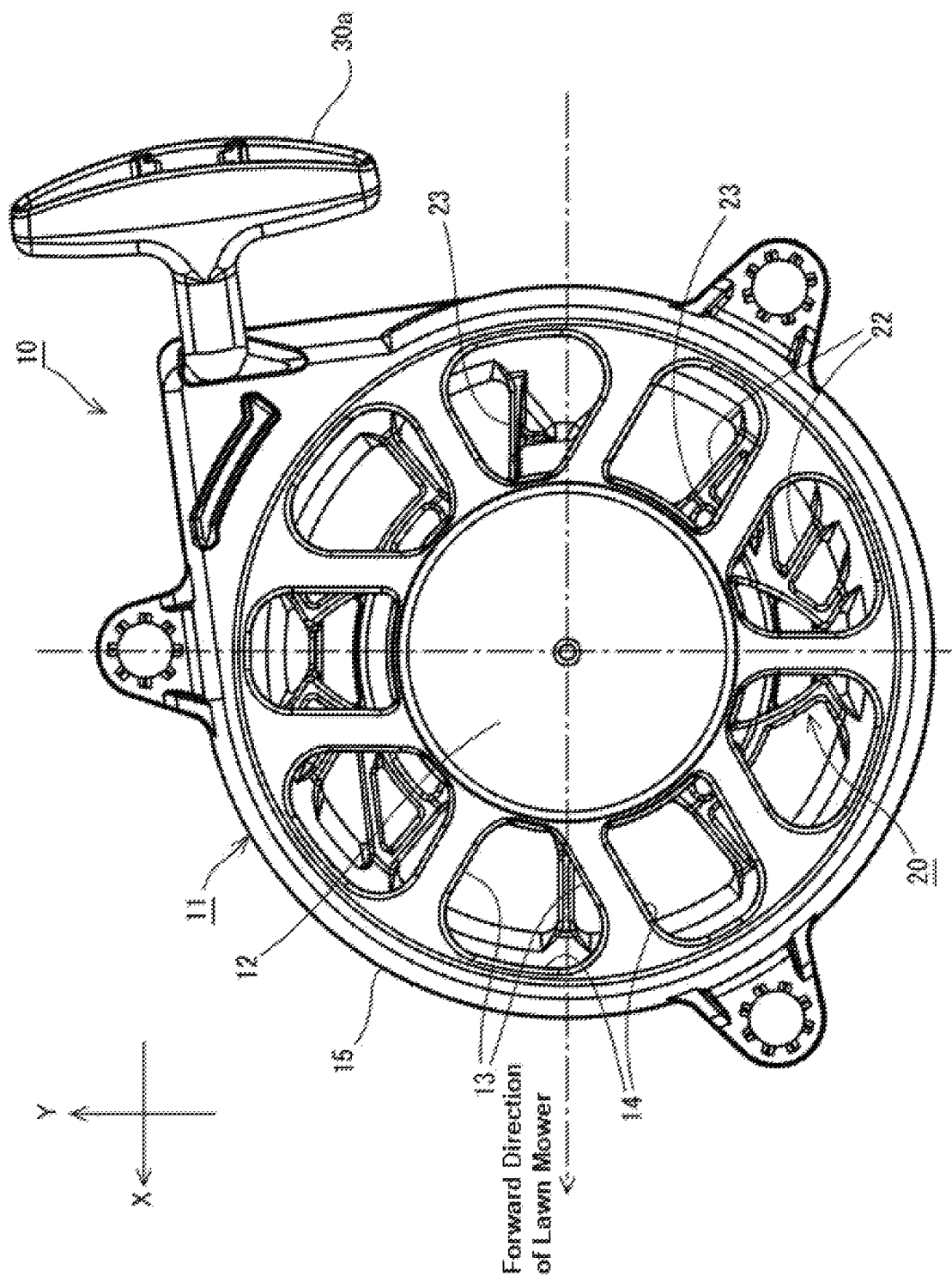
FIG. 1 is a plan view of an engine starting device.
Figure 2A:
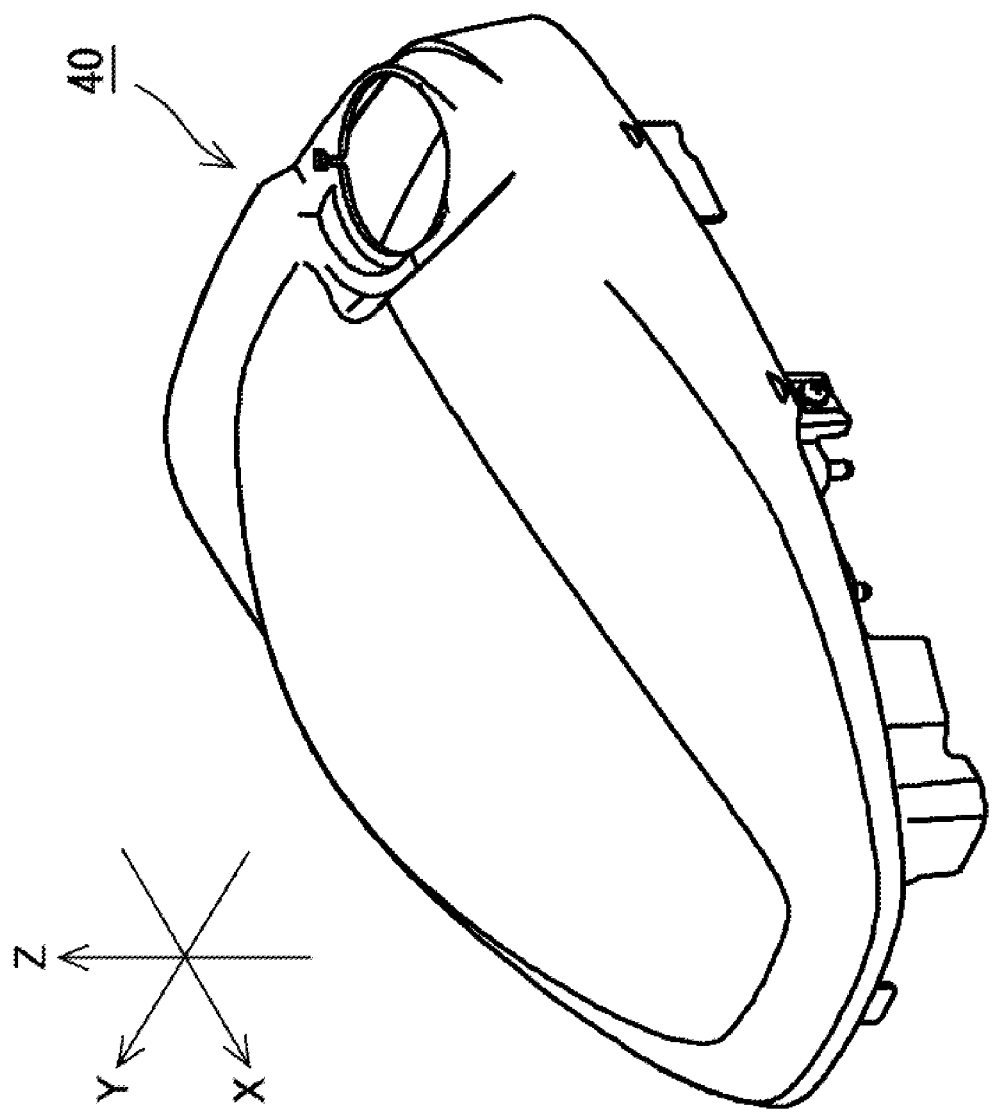
FIG. 2A is an external view of a body cover.
Figure 2B:
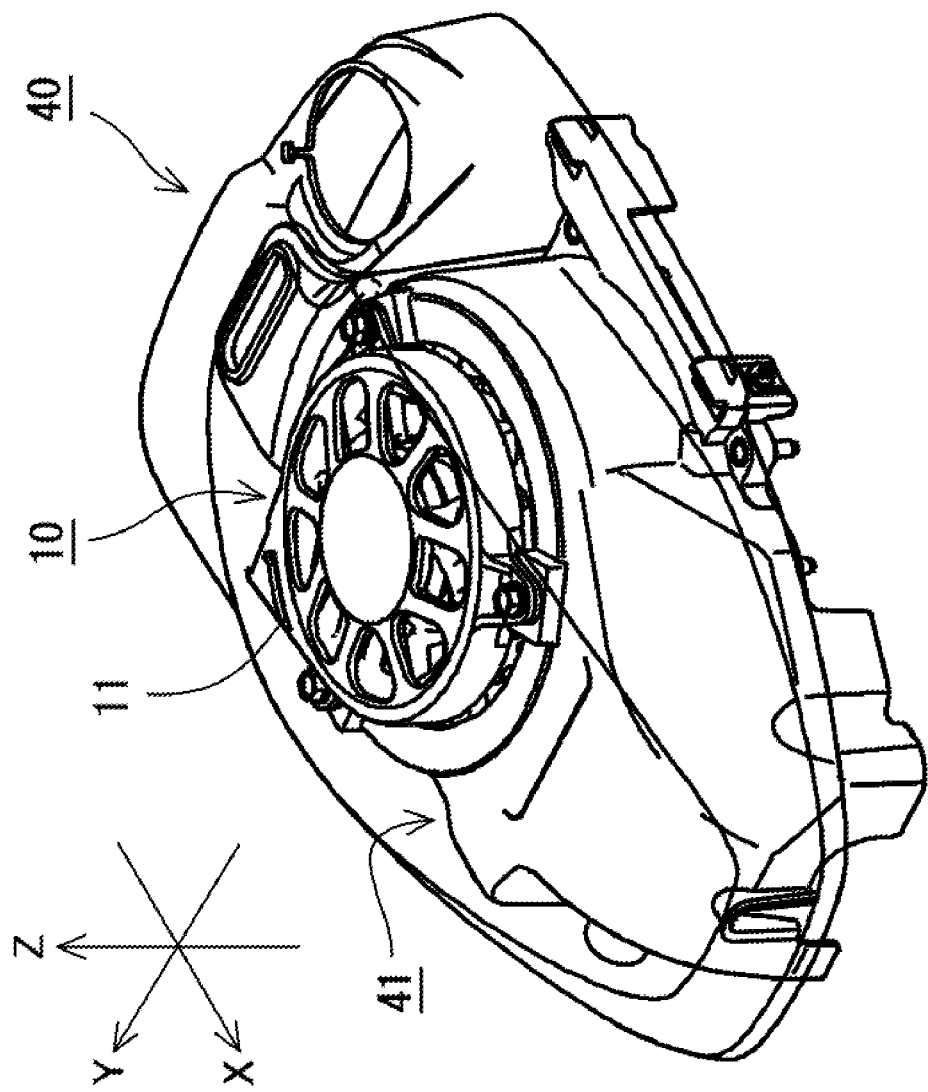
FIG. 2B is an image diagram when the engine starting device has been covered with the body cover.

An engine starting device 10 according to the present embodiment is designed to apply rotational force to an engine crankshaft 43 so as to start the engine. As shown in FIG. 1, the engine starting device 10 has a configuration in which a rope reel 20 is rotatably assembled to a starter case 11. The starting device 10 according to the present embodiment is, for example, built in an engine type lawn mower or the like. An engine portion 41 of the lawn mower and the starting device 10 are housed inside a body cover 40 shown in FIG. 2A. That is, as shown in FIG. 2B, the starting device 10 is attached to a front face of the engine portion 41, and the body cover 40 is attached so as to cover the engine portion 41 and the starting device 10.

Figure 3A:
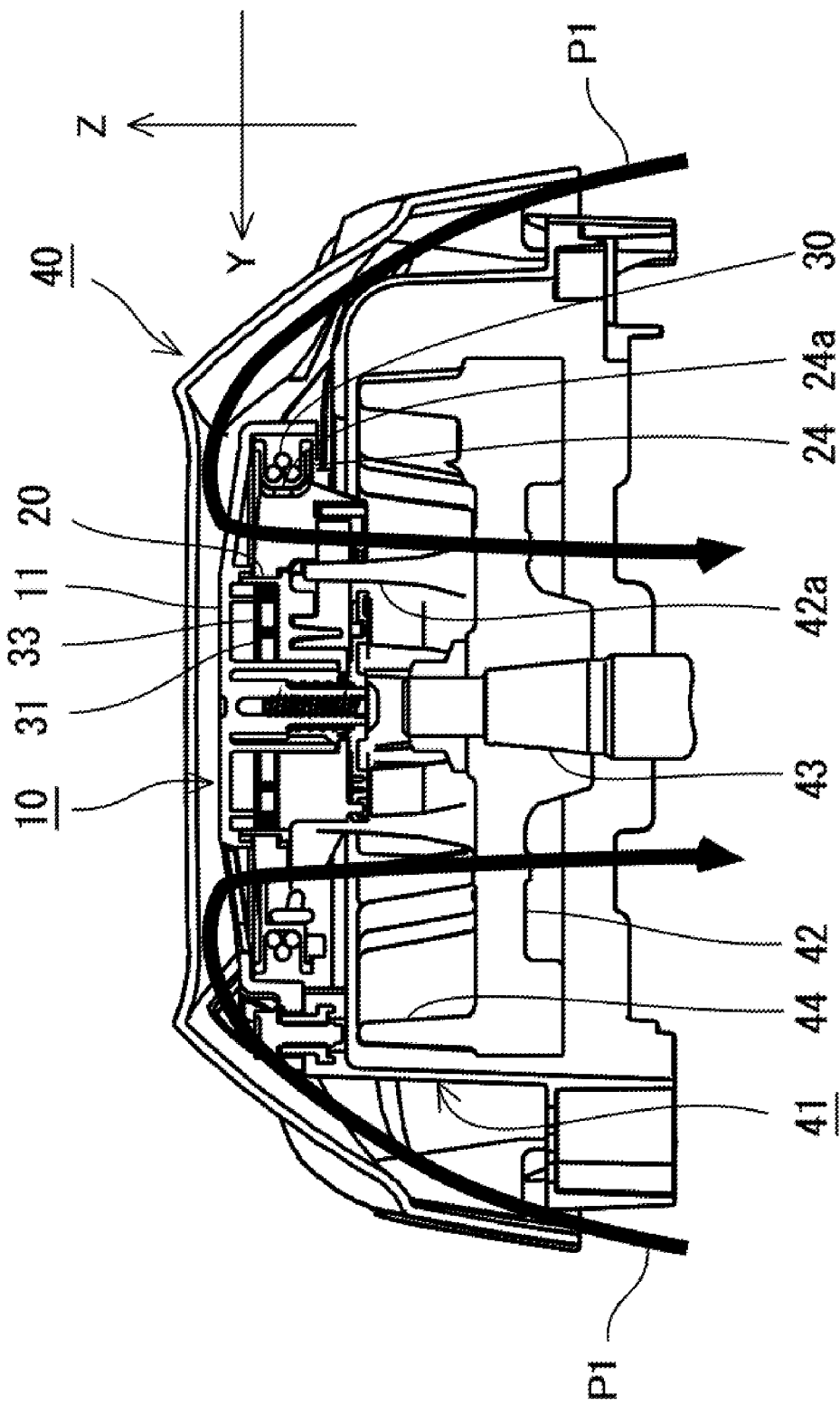
FIG. 3A is a sectional view illustrating a flow of cooling air.

A rotation member 42 shown in FIG. 3A is attached to the engine crankshaft 43 according to the present embodiment. The rotation member 42 is rotatably supported coaxially with a rotation shaft (a reel support shaft 12a which will be described later) of the rope reel 20. When rotational force of the rope reel 20 is transmitted to the rotation member 42, the engine crankshaft 43 integrally coupled to the rotation member 42 rotates so that the rotational force is applied to the engine to start the engine.

Further, a suction type cooling fan 44 is provided integrally with the rotation member 42. The cooling fan 44 which is designed to blow cooling air to the engine rotates integrally with the rotation member 42 (and the engine crankshaft 43). The cooling air generated by the cooling fan 44 flows along side faces of the body cover 40 toward the starting device 10, as designated by arrows P1 in FIG. 3A. Then, the cooling air passes through the inside (case opening portions 14 and reel opening portions 23 which will be described later) of the starting device 10 to flow toward the engine portion 41 (downward in the gravity direction).

Figure 3B:
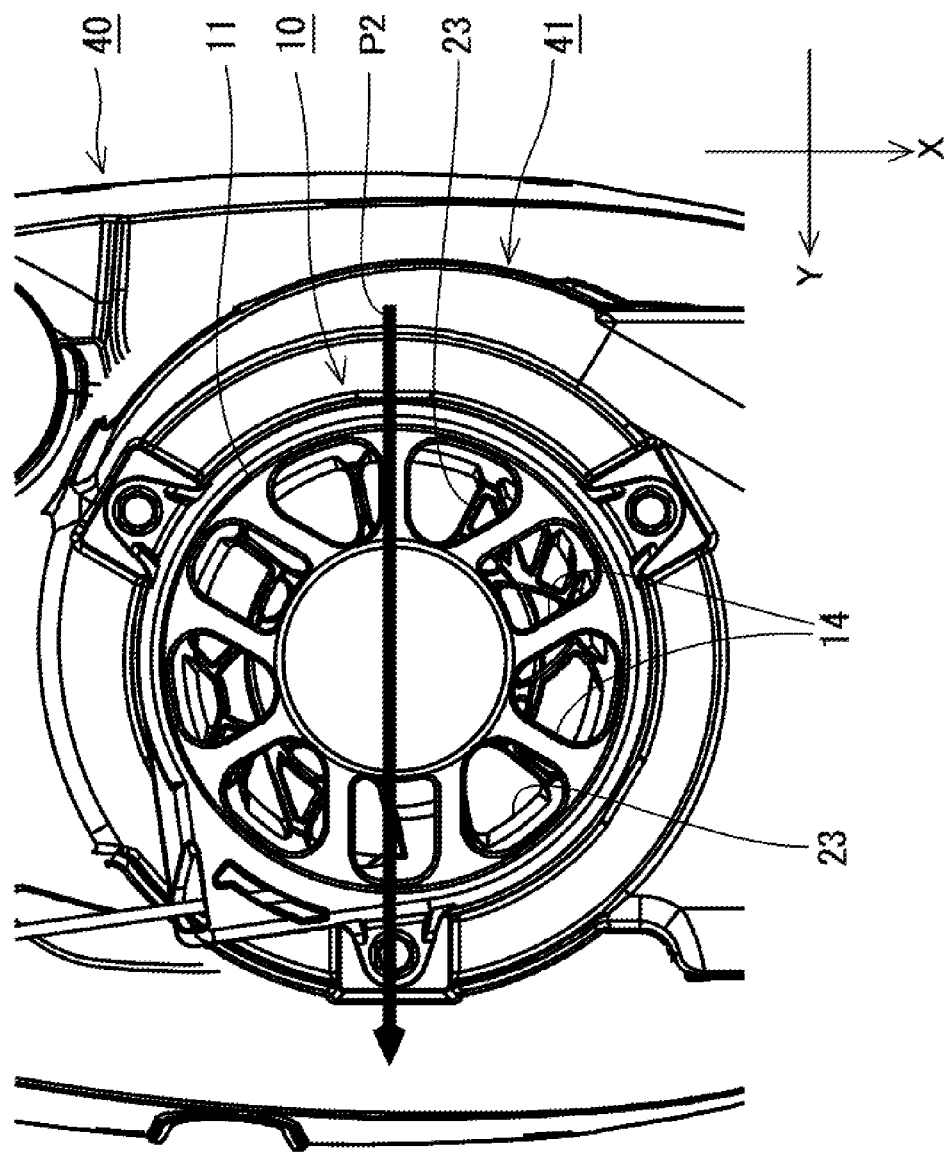
FIG. 3B is a plan view illustrating a flow of air caused by differential pressure.

However, in the present embodiment, in order to downsize the machine, the body cover 40 is adjacently attached to the starting device 10 to make an interval between a back face of the body cover 40 and a front face of the starting device 10 narrow, as shown in FIG. 3A. Therefore, when cooling air flows between the body cover 40 and the starting device 10, a flow rate of the cooling air changes, and atmospheric pressure changes accordingly. Since the change in atmospheric pressure is affected by the shapes, etc. of the body cover 40 and the starting device 10, the atmospheric pressure differs from one position to another. Due to the pressure difference, a flow of cooling air is generated in a direction (horizontal direction) crossing the starting device 10, as designated by an arrow P2 in FIG. 3B. When the flow of the cooling air crossing the starting device 10 is generated in this manner, foreign substances may flow toward the center of the starting device 10 due to the flow. Even if such a flow is generated, the starting device 10 according to the present embodiment can prevent the foreign substances from intruding into a space where a recoil spring 31 is housed.

Figure 9A:
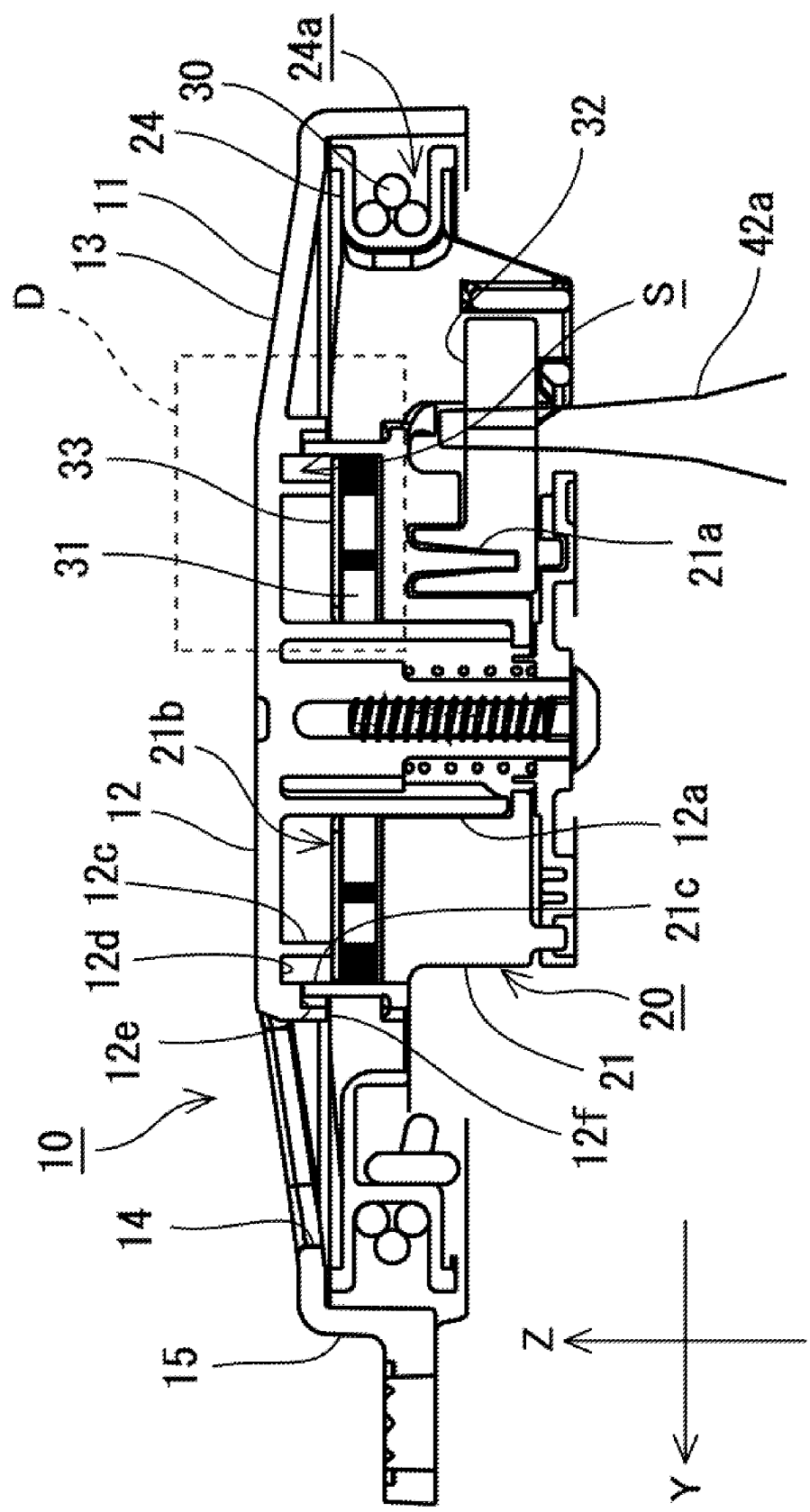
FIG. 9A is a sectional view of the starting device.

As shown in FIG. 9A, the starting device 10 according to the present embodiment includes the starter case 11, the rope reel 20, a rope 30, the recoil spring 31, a ratchet member 32, and a plate 33. Needless to say, these constituent members are merely examples, but different constituent members may be used alternatively as long as the object of the present invention can be achieved.

Figure 4:
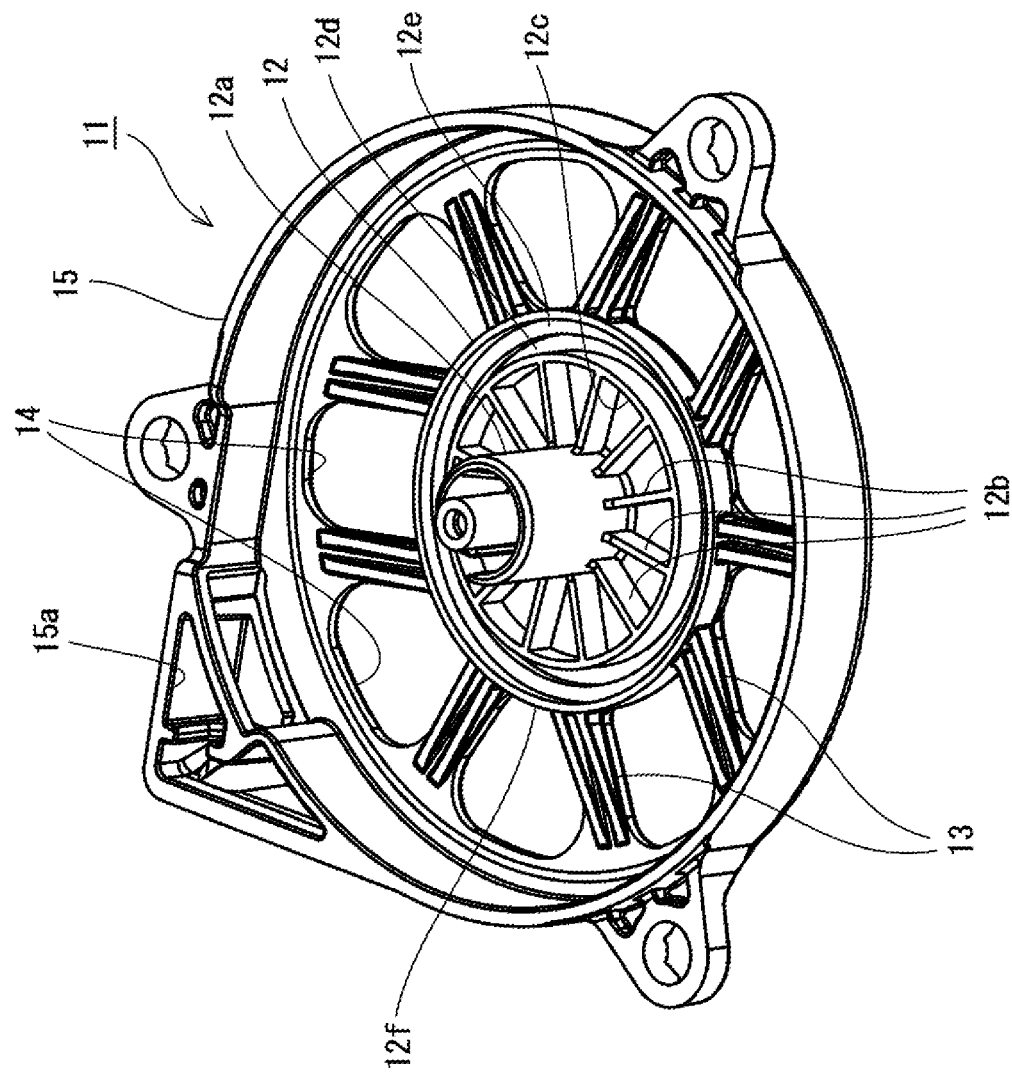
FIG. 4 is an external view of a starter case.
Figure 5:
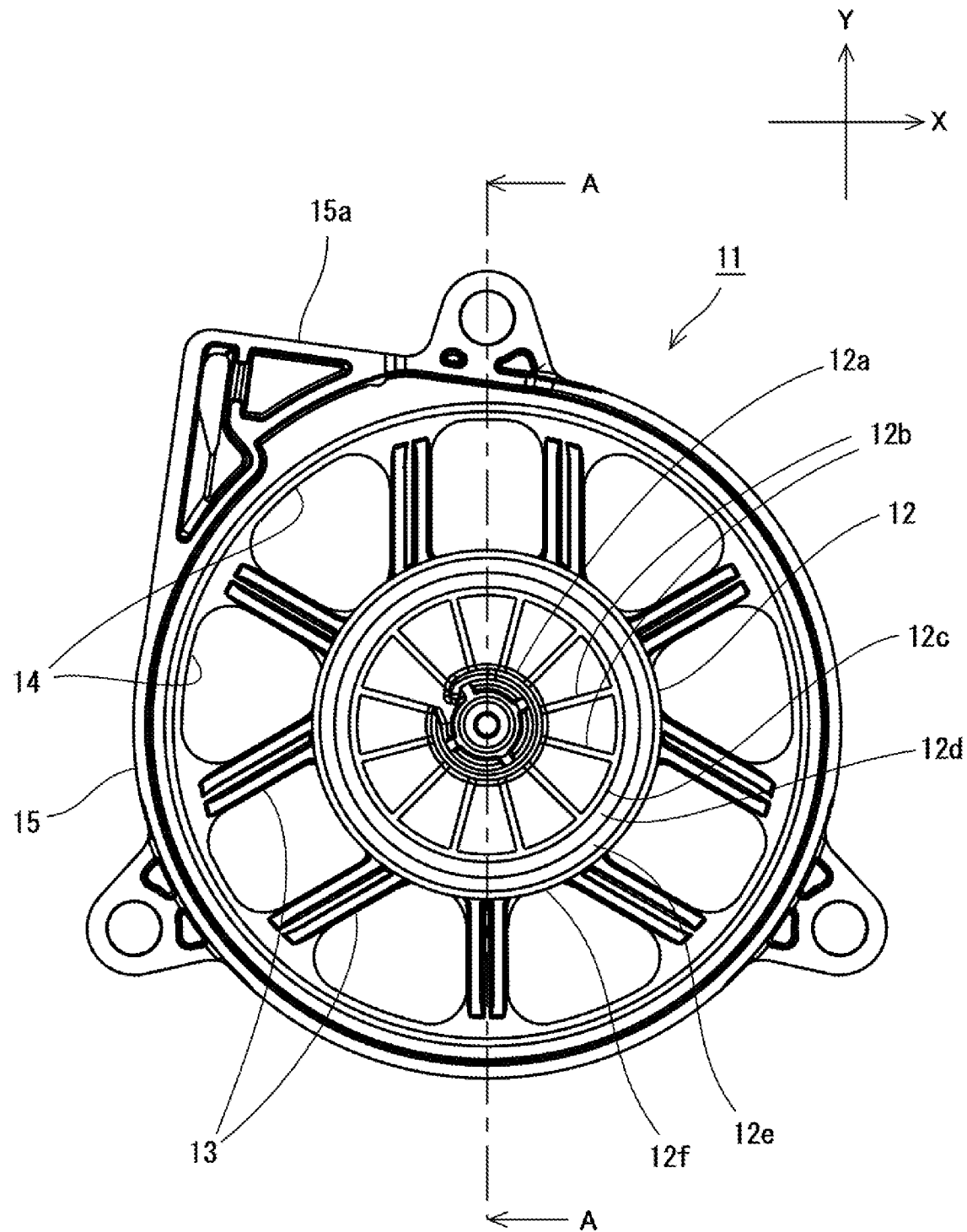
FIG. 5 is a bottom view of the starter case.
Figure 6:
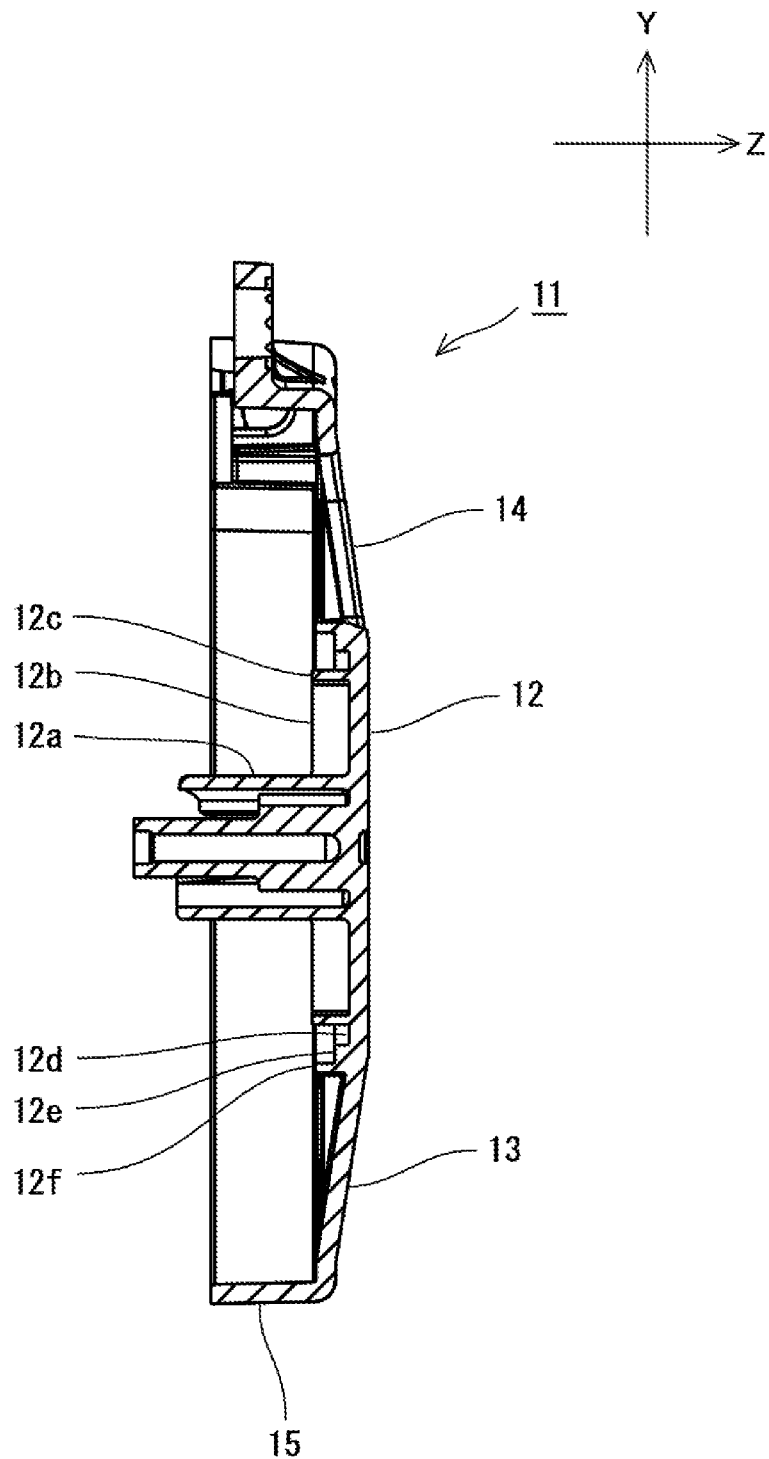
FIG. 6 is a sectional view taken along a line A-A of the starter case shown in FIG. 5.

The starter case 11 is a member that is fixed to an upper face portion of the engine while housing the main constituent components of the starting device 10. As shown in FIGS. 4 to 6, the starter case 11 has a case disk portion 12, and case bridge portions 13. The case disk portion 12 is substantially shaped like a circle in plan view and provided at the center of the starter case 11. The case bridge portions 13 are provided to radially extend from an outer circumferential edge of the case disk portion 12. An outer circumferential wall 15 is formed on distal ends of the case bridge portions 13 so as to cover an outer circumference of the starter case 11. In other words, the case disk portion 12 provided at the center and the outer circumferential wall 15 provided on the outer side are connected by the case bridge portions 13. A rope outlet 15a for letting out the rope 30 to the outside is formed as an opening in the outer circumferential wall 15. The rope 30 will be described later. Further, a gap between adjacent ones of the case bridge portions 13 forms a corresponding one of the case opening portions 14 penetrating in the front-back direction.

The reel support shaft 12a protruding so as to be opposed to the engine crankshaft 43 is provided at the center of the aforementioned case disk portion 12. The reel support shaft 12a is designed to rotatably attach the rope reel 20 thereto. The rope reel 20 will be described later.

Further, radial ribs 12b and a circular rib 12c are provided around the reel support shaft 12a, as shown in FIG. 5. The radial ribs 12b and the circular rib 12c are provided erectly in the same direction (gravity direction) as the protruding direction of the reel support shaft 12a and with a protruding amount smaller than that of the reel support shaft 12a. Of these, the radial ribs 12b which are plate-like portions formed linearly are provided radially around the reel support shaft 12a. The radial ribs 12b are provided at regular intervals when viewed in the circumferential direction of the reel support shaft 12a. Further, the circular rib 12c which is a plate-like portion formed into a circular shape is provided on a circular circumference with the reel support shaft 12a as the center, so that distal ends of the radial ribs 12b are connected to the circular rib 12c.

No rib is provided on an outer circumferential side of the circular rib 12c, as shown in FIG. 6. The place where no rib is provided is a circumferential groove portion 12d. In other words, the circumferential groove portion 12d is adjacently formed on the outer circumferential side of the circular rib 12c. The circumferential groove portion 12d is provided in order to form a pressure balancing chamber S which will be described later.

An opposed portion 12e is adjacently provided on an outer circumferential side of the circumferential groove portion 12d, and a second circumferential wall portion 12f is adjacently provided on an outer circumferential side of the opposed portion 12e.

Figure 10:
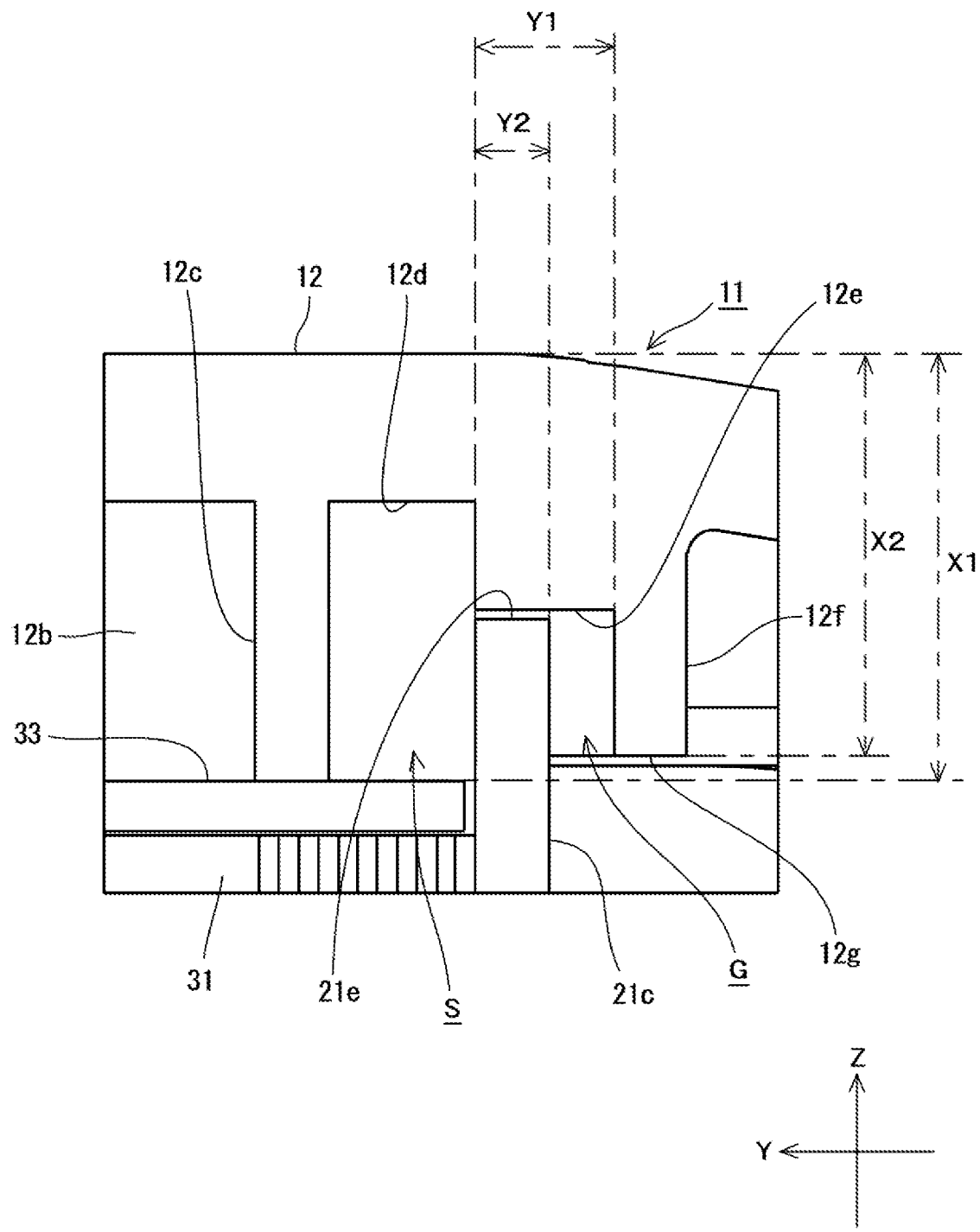
FIG. 10 is an enlarged view of a portion E shown in FIG. 9C.

The opposed portion 12e which is a portion formed to be slightly higher than the circumferential groove portion 12d is shaped like a circle and formed along the outer circumference of the circumferential groove portion 12d. As shown in FIG. 6, the opposed portion 12e is formed in the same direction (the gravity direction and on the rope reel 20 side) as the protruding direction of the reel support shaft 12a and with a smaller protruding amount than that of the radial ribs 12b and the circular rib 12c. Moreover, the protruding amount of the opposed portion 12e is set to be smaller than the protruding amount of the second circumferential wall portion 12f. As shown in FIG. 10, the opposed portion 12e is disposed so as to face an end edge 21e of a first circumferential wall portion 21c, which will be described later, or to abut against the end edge 21e of the first circumferential wall portion 21c. A width Y1 of the opposed portion 12e in a radial direction (left-right direction in FIG. 10) is formed to be larger than a width Y2 of the first circumferential wall portion 21c in the radial direction.

Figure 9B:
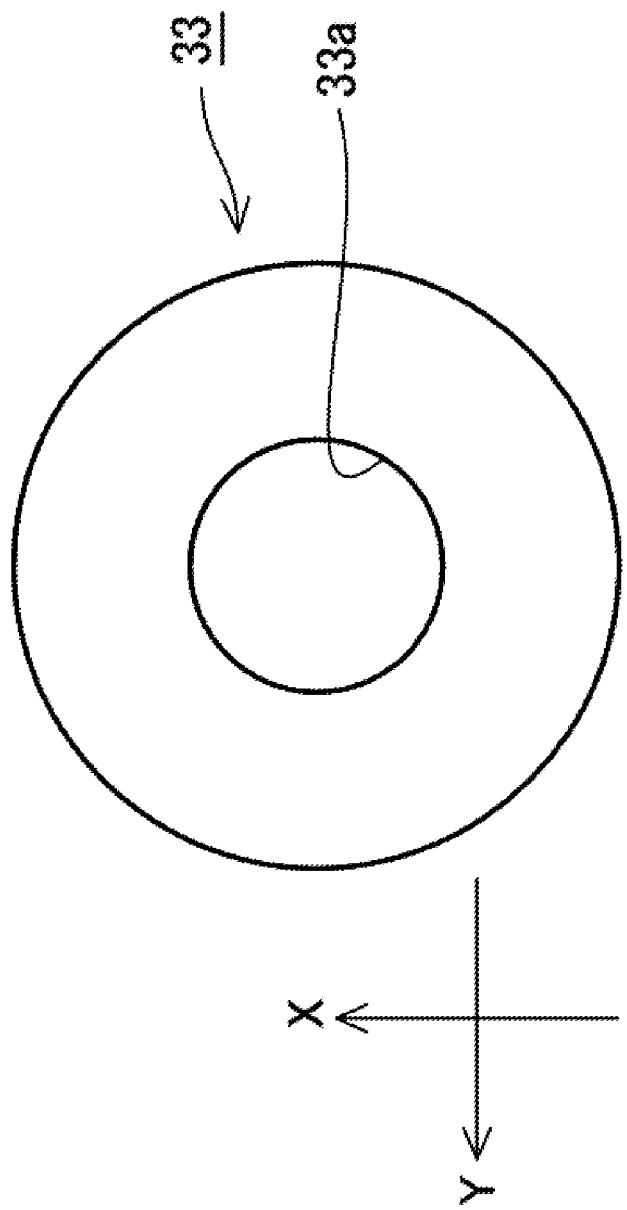
FIG. 9B is a plan view of a plate.
Figure 9C:
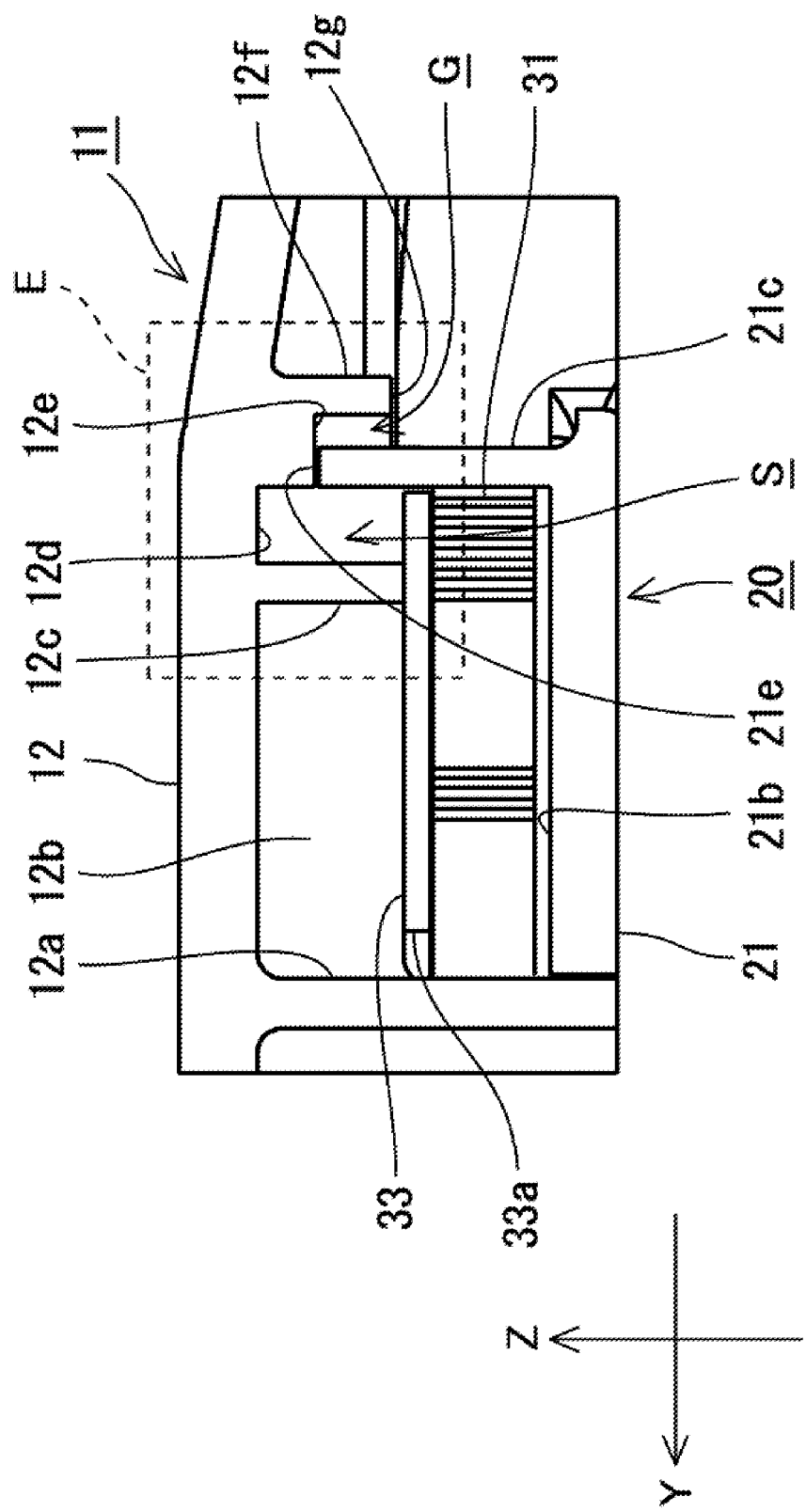
FIG. 9C is an enlarged view of a portion D shown in FIG. 9A.

The second circumferential wall portion 12f which is a portion formed to be slightly higher than the opposed portion 12e is shaped like a circle and erectly provided along the outer circumference of the opposed portion 12e. As shown in FIGS. 6 and 10, the second circumferential wall portion 12f is formed in the same direction (the gravity direction and on the rope reel 20 side) as the protruding direction of the reel support shaft 12a and with a protruding amount X2 smaller than the protruding amount X1 of the radial ribs 12b and the circular rib 12c. As shown in FIG. 9C, the second circumferential wall portion 12f is disposed so as to adjoin or abut against an outer circumferential face of the first circumferential wall portion 21c which will be described later. Therefore, the second circumferential wall portion 12f is disposed so as to cover an opposition position between the opposed portion 12e and the first circumferential wall portion 21c from the outside. In the present embodiment, the second circumferential wall portion 12f is erectly provided so as to adjoin the outer circumferential face of the first circumferential wall portion 21c. However, the present invention is not limited thereto but the second circumferential wall portion 12f may be erectly provided so as to adjoin an inner circumferential face of the first circumferential wall portion 21c.

The rope reel 20 which is a wheel-shaped member in which a retention groove 24a for winding the rope 30 therearound is formed is rotatably attached to the reel support shaft 12a. The rope 30 wound around the rope reel 20 has one end fixed to the rope reel 20, and the other end let out of the starter case 11. Therefore, when an operator pulls the let-out rope 30 vigorously, the rope reel 20 rotates around the reel support shaft 12a.

Figure 7:
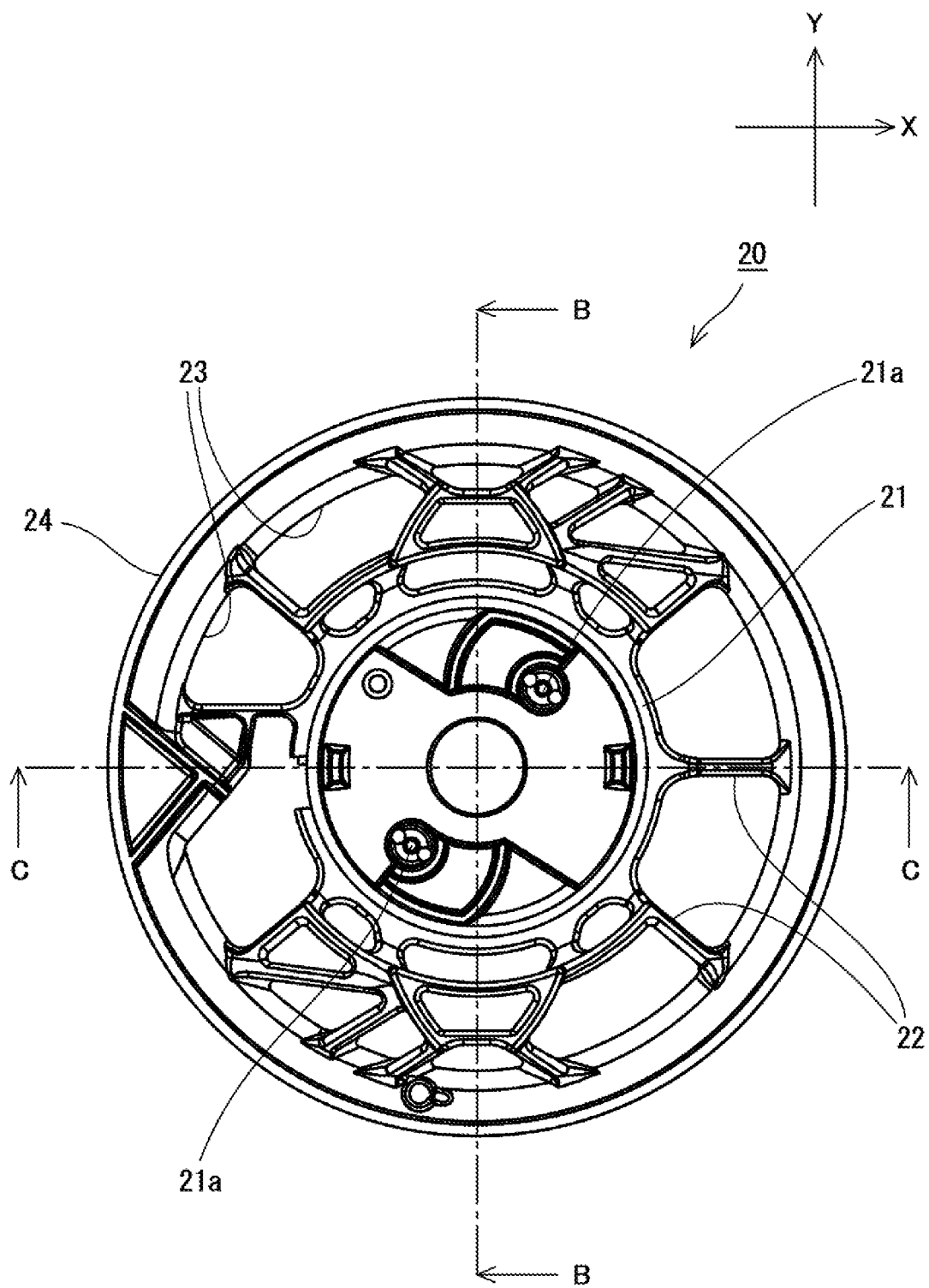
FIG. 7 is a bottom view of a rope reel.
Figure 8A:
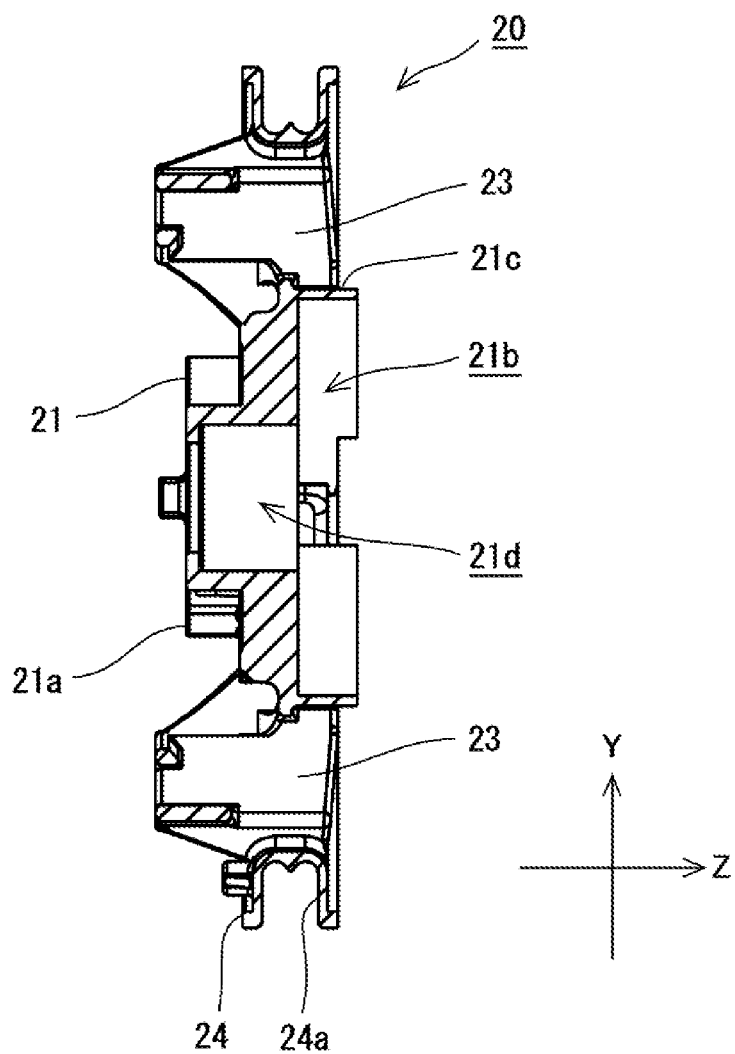
FIG. 8A is a sectional view taken along a line B-B of the rope reel shown in FIG. 7.
Figure 8B:
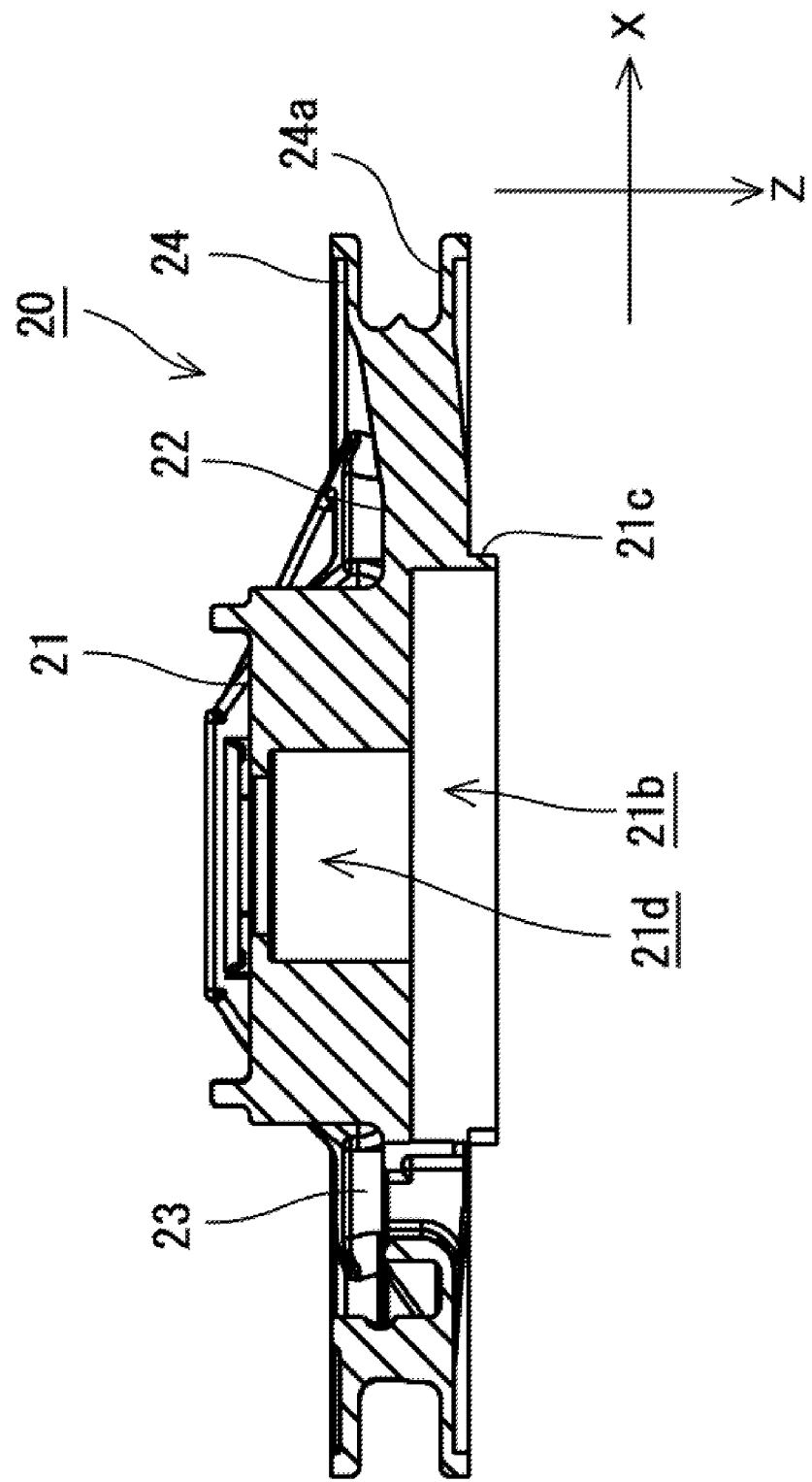
FIG. 8B is a sectional view taken along a line C-C of the rope reel shown in FIG. 7.

As shown in FIG. 7 and FIGS. 8A and 8B, the rope reel 20 includes a reel disk portion 21 which is substantially shaped like a circle in plan view and provided at the center of the rope reel 20, and reel bridge portions 22 which are provided to extend from an outer circumferential edge of the reel disk portion 21. Further, a rope retaining portion 24 is provided on outer sides of the reel bridge portions 22.

As shown in FIGS. 8A and 8B, a shaft hole 21d and a spring housing hole 21b are formed in a face of the aforementioned reel disk portion 21, which faces the starter case 11. The shaft hole 21d is a circular recess formed at the center of the reel disk portion 21. Further, the spring housing hole 21b which is a circular recess formed concentrically with the shaft hole 21d is formed to be larger in diameter and shallower than the shaft hole 21d. When the shaft hole 21d and the spring receiving hole 21b are formed in this manner, the shape of a stepwise hole is formed by the shaft hole 21d and the spring receiving hole 21b.

The shaft hole 21d is designed to insert the reel support shaft 12a thereinto. When the reel support shaft 12a is inserted through the shaft hole 21d, the rope reel 20 is rotatably attached to the reel support shaft 12a.

The spring housing hole 21b is a recess for housing the recoil spring 31 therein. The recoil spring 31 will be described later. An outer circumference of the spring housing hole 21b is surrounded by the first circumferential wall portion 21c. In other words, the spring housing hole 21b is formed by the first circumferential wall portion 21c which is erectly provided in the circular shape. The first circumferential wall portion 21c is erectly provided so as to surround an outer circumference of the recoil spring 31 housed in the spring housing hole 21b.

Further, ratchet swinging shafts 21a are provided on an opposite face of the reel disk portion 21 to the face in which the shaft hole 21d and the spring housing hole 21b are formed. The ratchet swinging shafts 21a which are designed to swingably attach the ratchet member 32 thereto are provided at eccentric positions deviated from the center of the reel disk portion 21. The ratchet member 32 will be described later.

The reel bridge portions 22 are formed into a mesh shape so that the reel disk portion 21 provided at the center and the rope retaining portion 24 provided on the outer side can be connected through the reel bridge portions 22. Further, a gap between adjacent ones of the reel bridge portions 22 formed into the mesh shape forms a corresponding one of the reel opening portions 23 penetrating in the front-back direction. As shown in FIG. 1, an area where the reel bridge portions 22 and the reel opening portions 23 are formed and an area where the aforementioned case bridge portions 13 and the aforementioned case opening portions 14 are formed are arranged to overlap each other in the gravity direction in plan view. With this arrangement, cooling air flowing from above the starter case 11 can pass through the case opening portions 14 and the reel opening portions 23 and then go toward the engine side.

The rope retaining portion 24 is a portion which is shaped like a ring and formed along an outer circumference of the rope reel 20. The retention groove 24a for winding the rope 30 therearound is formed in an outer circumference of the rope retaining portion 24. The rope 30 wound around the retention groove 24a of the rope reel 20 has one end locked to the rope reel 20 inside the retaining groove 24a, and the other end let out of the starter case 11 from the rope outlet 15a. As shown in FIG. 1, a substantially T-shaped grip 30a which can be gripped by an operator in order to perform an operation of pulling the rope 30 is provided at the end portion of the rope 30 which has been let out of the starter case 11.

The recoil spring 31 is a spiral spring that is housed between the starter case 11 and the rope reel 20 to exert urging force in a direction to rewind the rope 30. The recoil spring 31 accumulates spring force when the rope 30 is let out by the operator to cause rotation of the rope reel 20. Then, as soon as the operator releases the let-out rope 30, the rope reel 20 is reversely rotated by the accumulated spring force so as to automatically rewind the rope 30. As shown in FIG. 9A, the recoil spring 31 is disposed inside the spring housing hole 21b so as to be wound around the reel support shaft 12a. The recoil spring 31 has a center side end portion fixed to the starter case 11 (the reel support shaft 12a) and an outer side end portion fixed to the first circumferential wall portion 21c.

The ratchet member 32 is a member which is designed to transmit the rotational force of the rope reel 20 to the engine side when the rope 30 is pulled, and not to transmit the rotational force of the engine side to the rope reel 20 after the engine is started. The ratchet member 32 is swingably attached to the ratchet swinging shafts 21a formed on the side face of the rope reel 20.

Since any well-known structure can be applied to the ratchet member 32, details of the effect of the ratchet member 32 will not be described. However, only when the rope reel 20 has tended to rotate in the direction to start the engine, the ratchet member 32 swings to be engaged with an engaging portion 42a formed in the rotation member 42 on the engine side. That is, when the rope 30 is let out to cause the rotation of the rope reel 20, the ratchet member 32 swings to be engaged with the engaging portion 42a, and the rotational force of the rope reel 20 is transmitted to the engine side. On the other hand, when the rope reel 20 is rotating in the direction to rewind the rope 30 or when the rope reel 20 is not rotating, the ratchet member 32 swings in a retraction direction so as not to be engaged with the engine side.

The plate 33 is a circular plate-like member disposed inside the first circumferential wall portion 21c, that is, in the spring housing hole 21b. An outer diameter of the plate 33 is formed so as to extend along the inner circumferential face of the first circumferential wall portion 21c. Further, as shown in FIG. 9B, a circular through hole 33a is formed at the center of the plate 33. The through hole 33a is designed to penetrate the reel support shaft 12a. As shown in FIGS. 9A to 9C, the plate 33 is attached so as to cover the recoil spring 31 housed in the spring housing hole 21b, from above. Thus, the plate 33 is disposed so as to partition the starter case 11 and the recoil spring 31 from each other.

Further, as shown in FIG. 9C, the plate 33 is pressed by the circular rib 12c and the radial ribs 12b of the starter case 11 so as not to float up. That is, the plate 33 is sandwiched and retained by the starter case 11 and the recoil spring 31. With this arrangement, the plate 33 is housed inside the first circumferential wall portion 21c without looseness.

The aforementioned members are used in combination in the state shown in FIG. 9A. On this occasion, the end edge 21e of the first circumferential wall portion 21c and an end edge 12g of the second circumferential wall portion 12f are disposed so as to overlap each other when viewed in the radial direction (the left-right direction in FIG. 9C), as shown in FIG. 9C. Accordingly, a labyrinth seal is formed by the first circumferential wall portion 21c and the second circumferential wall portion 12f which overlap each other. Therefore, foreign substances in this structure are difficult to intrude into the housing portion of the recoil spring 31. Moreover, such a labyrinth seal is constituted by only the rope reel 20 and the starter case 11. Thus, it is unnecessary to use another member so that thickness of the starting device 10 also does not increase. Consequently, the structure for preventing the recoil spring 31 from being deformed or damaged can be realized in a space-saving manner.

In addition, in the present embodiment, a distal end of the first circumferential wall portion 21c faces or abuts against the opposed portion 12e. Thus, a gap on the distal end side of the first circumferential wall portion 21c is minimized. Therefore, foreign substances in the structure are more difficult to intrude into the housing portion of the recoil spring 31.

The seal structure constituted by only the rope reel 20 and the starter case 11 is simple. Therefore, when a gap is generated due to a molding error, an assembling error, or the like of any of these components, foreign substances may intrude into the seal. Particularly, the body cover 40 is adjacently attached to the starting device 10 in order to downsize the machine as in the present embodiment. With this arrangement, foreign substances may flow into the housing portion of the recoil spring 31 provided at the center, in a case where a flow of cooling air has been generated in a direction crossing the starting device 10 (see the arrow P2 in FIG. 3B). Even if the foreign substances have intruded into the seal (see the pressure balancing chamber S in FIG. 9C), the foreign substances still cannot reach the recoil spring 31 due to the plate 33 which is disposed so as to partition the starter case 11 and the recoil spring 31 from each other. Rather, since the seal structure is simple, the intruding foreign substances in the structure flow on a front face of the plate 33 to be easily discharged to the outside. Accordingly, the recoil spring 31 is configured so as not to be affected by the foreign substances.

In addition, according to the configuration in the present embodiment, when the starter case 11 is attached to the engine in use, cooling air for cooling the engine passes through the case opening portions 14 and the reel opening portions 23 to flow along the outer circumferential faces of the first circumferential wall portion 21c and the second circumferential wall portion 12f. On this occasion, the cooling air flows in the extending direction (downward in FIG. 9A) of the second circumferential wall portion 12f provided on the outer circumferential side than the first circumferential wall portion 21c (see FIG. 3A). Therefore, a gap G (see FIG. 9C) between the first circumferential wall portion 21c and the second circumferential wall portion 12f is opened in a direction different from the flow of the cooling air and is not opened toward the flow of the cooling air. Accordingly, foreign substances in the structure are difficult to intrude from the gap G.

In addition, according to the configuration in the present embodiment, the cooling air flows in the extending direction of the second circumferential wall portion 12f. However, the present invention is not limited thereto. Configuration may be made alternatively as long as the cooling air in the configuration flows in the extending direction of one of the first circumferential wall portion 21c and the second circumferential wall portion 12f, which is provided on the outer circumferential side. That is, the configuration may be made in such a manner that when the first circumferential wall portion 21c is provided on the outer circumferential side than the second circumferential wall portion 12f, the cooling air flows in the extending direction of the first circumferential wall portion 21c.

Further, in the present embodiment, the ring-like (donut-shaped) pressure balancing chamber S is formed inside the first circumferential wall portion 21c, as shown in FIG. 9C. The pressure balancing chamber S is a space formed between the circumferential groove portion 12d of the starter case 11 and the plate 33. Due to the pressure balancing chamber S formed thus, a pressure difference in the circumferential direction can be reduced, so that a flow of air indicated by the arrow P2 in FIG. 3B can be reduced. Thus, the flow of the air crossing the housing portion of the recoil spring 31 can decrease so that intrusion of foreign substances can be reduced. Further, even if the foreign substances have intruded into the seal, the foreign substances are moved into the pressure balancing chamber S. Consequently, the foreign substances can be prevented from flowing into the housing portion of the recoil spring 31.

What is claimed is:

1. An engine starting device comprising:
    a starter case;
    a rope reel that is rotatably assembled to the starter case;
    a rope that is wound around a retention groove formed in the rope reel; and
    a recoil spring that is housed between the starter case and the rope reel to exert an urging force in a direction to rewind the rope, wherein:
        the rope reel includes a first circumferential wall portion that is erectly provided so as to surround an outer circumference of the recoil spring,
        the starter case includes a second circumferential wall portion that is erectly provided so as to adjoin an inner circumferential face or an outer circumferential face of the first circumferential wall portion,
        the first circumferential wall portion and the second circumferential wall portion are disposed so that an end edge of the first circumferential wall portion overlaps an edge of the second circumferential wall portion when viewed in a radial direction of the starter case,
        a plate is disposed between the starter case and the recoil spring inside the first circumferential wall portion, and
        an edge of the first circumferential wall portion extends toward the starter case to a point further in an axial direction of the rope reel than the plate.

2. The engine starting device according to claim 1, wherein the plate is sandwiched between the starter case and the recoil spring, and retained by the starter case and the recoil spring.

3. The engine starting device according to claim 1, wherein:
    the starter case is configured to be attached to an engine in use, such that cooling air for cooling the engine flows along the outer circumferential face of the first circumferential wall portion or an outer circumferential face of the second circumferential wall portion,
    when the first circumferential wall portion is located on an outer circumferential side of the second circumferential wall portion, the cooling air flows in an extending direction of the first circumferential wall portion, and
    when the second circumferential wall portion is located on an outer circumferential side of the first circumferential wall portion, the cooling air flows in an extending direction of the second circumferential wall portion.

4. The engine starting device according to claim 2, wherein:
    the starter case is configured to be attached to an engine in use, such that cooling air for cooling the engine flows along the outer circumferential face of the first circumferential wall portion or an outer circumferential face of the second circumferential wall portion,
    when the first circumferential wall portion is located on an outer circumferential side of the second circumferential wall portion, the cooling air flows in an extending direction of the first circumferential wall portion, and
    when the second circumferential wall portion is located on an outer circumferential side of the first circumferential wall portion, the cooling air flows in an extending direction of the second circumferential wall portion.

5. The engine starting device according to claim 1, wherein a gap between the first circumferential wall portion and the second circumferential wall portion forms an opening facing a direction different from a flow of cooling air.

6. The engine starting device according to claim 2, wherein a gap between the first circumferential wall portion and the second circumferential wall portion forms an opening facing a direction different from a flow of cooling air.

7. The engine starting device according to claim 3, wherein a gap between the first circumferential wall portion and the second circumferential wall portion forms an opening facing a direction different from a flow of cooling air.

8. The engine starting device according to claim 4, wherein a gap between the first circumferential wall portion and the second circumferential wall portion forms an opening facing a direction different from a flow of cooling air.

9. The engine starting device according to claim 1, wherein a ring shaped pressure balancing chamber is formed between the starter case and the plate inside the first circumferential wall portion.

10. The engine starting device according to claim 2, wherein a ring shaped pressure balancing chamber is formed between the starter case and the plate inside the first circumferential wall portion.

11. The engine starting device according to claim 3, wherein a ring shaped pressure balancing chamber is formed between the starter case and the plate inside the first circumferential wall portion.

12. The engine starting device according to claim 4, wherein a ring shaped pressure balancing chamber is formed between the starter case and the plate inside the first circumferential wall portion.

13. The engine starting device according to claim 5, wherein a ring shaped pressure balancing chamber is formed between the starter case and the plate inside the first circumferential wall portion.

14. The engine starting device according to claim 6, wherein a ring shaped pressure balancing chamber is formed between the starter case and the plate inside the first circumferential wall portion.

15. The engine starting device according to claim 7, wherein a ring shaped pressure balancing chamber is formed between the starter case and the plate inside the first circumferential wall portion.

16. The engine starting device according to claim 8, wherein a ring shaped pressure balancing chamber is formed between the starter case and the plate inside the first circumferential wall portion.

* * * * *